US008984618B2

(12) United States Patent
Yoon et al.

(10) Patent No.: US 8,984,618 B2
(45) Date of Patent: Mar. 17, 2015

(54) SYSTEM FOR MANAGING VIRTUAL PRIVATE NETWORK AND METHOD THEREOF

(75) Inventors: Ho Sun Yoon, Daejeon (KR); Sung Back Hong, Daejeon (KR); Jung Sik Kim, Daejeon (KR); Seong Moon, Daejeon (KR); Sun Cheul Kim, Daejeon (KR); Seung Woo Hong, Daejeon (KR); Sang Jin Hong, Gyeonggi-do (KR); Pyung Koo Park, Daejeon (KR); Young Soo Shin, Daejeon (KR); Ho Yong Ryu, Daejeon (KR); Soon Seok Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 77 days.

(21) Appl. No.: 13/611,925

(22) Filed: Sep. 12, 2012

(65) Prior Publication Data
US 2013/0133057 A1 May 23, 2013

(30) Foreign Application Priority Data

Nov. 22, 2011 (KR) .......................... 10-2011-0122367

(51) Int. Cl.
G06F 21/00 (2013.01)
H04L 29/06 (2006.01)
(52) U.S. Cl.
CPC ............ *G06F 21/00* (2013.01); *H04L 63/0236* (2013.01); *H04L 63/0272* (2013.01); *H04L 63/0245* (2013.01); *H04L 63/0227* (2013.01)
USPC ................... 726/12; 726/11; 726/13; 726/14; 726/15; 713/156

(58) Field of Classification Search
CPC . H04L 63/0272; H04L 63/0277; H04L 63/20; H04L 63/0236; H04L 63/0245; H04L 63/0227; G06F 21/00
USPC ........................................ 726/11–15; 713/156
See application file for complete search history.

(56) References Cited

U.S. PATENT DOCUMENTS 6,185,680 B1 * 2/2001 Shimbo et al. ................. 713/160
6,668,343 B1 * 12/2003 Kim et al. ...................... 714/702
(Continued)

FOREIGN PATENT DOCUMENTS

KR 1020010040075 5/2001

*Primary Examiner* — Kambiz Zand
*Assistant Examiner* — Tongoc Tran
(74) *Attorney, Agent, or Firm* — Nelson Mullins Riley & Scarborough LLP; Anthony A. Laurentano, Esq.; Lewis Lee, Esq.

(57) ABSTRACT

Disclosed are a system for managing virtual private networks (VPNs) includes: terminals configured to transmit user data; a manager configured to transmit information for concealing networks and managing the VPNs; border gateways configured to decrypt the user data and perform a network address translation (NAT) procedure and a filtering procedure on the decrypted user data based on the information; and servers configured to receive the user data subjected to the NAT procedure and the filtering procedure, wherein the filtering procedure is a procedure discarding the user data to be transferred to the servers that are not allowed so as to allow the terminals to access only the allowed servers, the NAT procedure is a procedure changing an Internet protocol (IP) address used in a first network to an IP address used in a second network, and the first network and the second network are different networks.

19 Claims, 5 Drawing Sheets

(56) References Cited

U.S. PATENT DOCUMENTS

| | | |
|---|---|---|
| 7,155,518 B2* | 12/2006 | Forslow .................. 709/227 |
| 7,533,409 B2* | 5/2009 | Keane et al. ................ 726/13 |
| 7,751,391 B2 | 7/2010 | Boden et al. |
| 7,840,701 B2 | 11/2010 | Hsu et al. |
| 7,898,963 B2* | 3/2011 | Ottamalika et al. .......... 370/241 |
| 8,094,810 B2* | 1/2012 | Hohenberger et al. ......... 380/28 |
| 8,228,818 B2* | 7/2012 | Chase et al. ................ 370/253 |
| 2002/0162026 A1* | 10/2002 | Neuman et al. ............... 713/201 |
| 2002/0184527 A1* | 12/2002 | Chun et al. .................. 713/201 |
| 2003/0145228 A1* | 7/2003 | Suuronen et al. ............. 713/201 |
| 2006/0059370 A1* | 3/2006 | Asnis et al. .................. 713/189 |
| 2008/0072033 A1* | 3/2008 | McAlister ..................... 713/153 |
| 2009/0067440 A1* | 3/2009 | Chadda et al. ................ 370/401 |
| 2011/0107413 A1* | 5/2011 | Chawla et al. ................. 726/12 |
| 2011/0289134 A1* | 11/2011 | de los Reyes et al. ........ 709/203 |
| 2011/0320577 A1* | 12/2011 | Bhat et al. .................... 709/222 |

* cited by examiner

FIG. 5

| Source IP | | | | Destination IP | | | | Flag |
|---|---|---|---|---|---|---|---|---|
| Original | | New | | Original | | New | | |
| IP | Port | IP | Port | IP | Port | IP | Port | |
| MN | | BG1 | | S#2_V | | S#2 | | Set |
| MN | MN_OSP | BG1 | BG1_NSP | S#1_V | S#1_V_ODP | S#1 | S#1_NDP | Set |
| S#1 | S#1_NDP | S#1_V | S#1_V_ODP | BG1 | BG1_NSP | MN | MN_OSP | Unset |
| ... | ... | ... | ... | ... | ... | ... | ... | ... |

SYSTEM FOR MANAGING VIRTUAL PRIVATE NETWORK AND METHOD THEREOF

CROSS-REFERENCE TO RELATED APPLICATIONS

This application claims priority to and the benefit of Korean Patent Application No. 10-2011-0122367 filed in the Korean Intellectual Property Office on Nov. 22, 2011, the entire contents of which are incorporated herein by reference.

TECHNICAL FIELD

The present invention relates to a system for managing virtual private networks (VPNs) and a method thereof which are capable of improving safety of the VPNs by concealing specific networks from external networks.

BACKGROUND ART

Generally, attacks to private networks or specific servers have features intensively attacking an Internet protocol (IP) address of a target of attack like DDoS. In order to solve the above problem, firewall or virtual private network (VPN) technologies have been generally used. The firewall is used to prevent the corresponding servers or private networks from being attacked due to packets like the DDoS, and the VPN is a technology for controlling an access of only valid users to the private networks. However, the technology may be attacked at all times since the corresponding private networks or servers are exposed to the outside. In order to solve the above problem, the private networks or the servers need to be designed so as not to be exposed to the outside. The description of the virtual private networks is also disclosed in Korean Patent Application No. 10-2004-0001570.

SUMMARY OF THE INVENTION

The present invention has been made in an effort to provide a system for managing virtual private networks (VPNs) and a method thereof which are capable of improving safety of the VPNs by concealing specific networks from external networks.

An exemplary embodiment of the present invention provides a system for managing virtual private networks (VPNs), including: terminals configured to transmit user data; a manager configured to transmit information for concealing networks and managing the VPNs; border gateways configured to decrypt the user data and perform a network address translation (NAT) procedure and a filtering procedure on the decrypted user data based on the information; and servers configured to receive the user data subjected to the NAT procedure and the filtering procedure, wherein the filtering procedure is a procedure discarding the user data to be transferred to the servers that are not allowed so as to allow the terminals to access only the allowed servers, the NAT procedure is a procedure changing an Internet protocol (IP) address used in a first network to an IP address used in a second network, and the first network and the second network are different networks.

The first network may be a public network, and the second network may be a private network or a public network.

The information transmitted by the manager may include the terminal addresses, VPN groups accessible by the terminals, server lists accessible in the VPN groups, virtual server addresses used in the public networks, server addresses used in the private networks, and the border gateway addresses.

The border gateways may discard the user data to be transferred to servers other than server lists accessible in the VPN groups.

The border gateways may separate the public networks from the private networks through the NAT procedure.

The manager may select any border gateway to be accessed, among a plurality of border gateways.

The system for managing VPNs may further include: access gateways configured to perform the NAT procedure on the server data so as to transfer the server data to the terminals.

The access gateways may perform encryption after the NAT procedure performed on the server data.

The border gateways may decrypt the encrypted server data, perform the NAT procedure and the encryption on the decrypted server data, and transmit the encrypted server data to the terminals.

The manager may randomly generate the virtual addresses of the servers and allocate the generated virtual addresses to the servers, wherein the virtual addresses are differently allocated to the servers every time according to the users or the VPN groups.

Another exemplary embodiment of the present invention provides a method for managing virtual private networks (VPNs), including: transmitting user data by terminals; transmitting information for concealing networks and managing the VPNs by a manager; decrypting the user data and performing a network address translation (NAT) procedure and a filtering procedure on the decrypted user data based on the information, by border gateways; and receiving the user data subjected to the NAT procedure and the filtering procedure by servers, wherein the filtering procedure is a procedure discarding the user data to be transferred to the servers that are not allowed so as to allow the terminals to access only the allowed servers, the NAT procedure is a procedure changing an Internet protocol (IP) address used in a first network to an IP address used in a second network, and the first network and the second network are different networks.

The system for managing virtual private networks (VPNs) and a method thereof according to the exemplary embodiments of the present invention can improve the safety of the VPNs by concealing the specific networks from the external networks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 5 is a diagram showing an extended NAT table according to an exemplary embodiment of the present invention.

Figure 1:
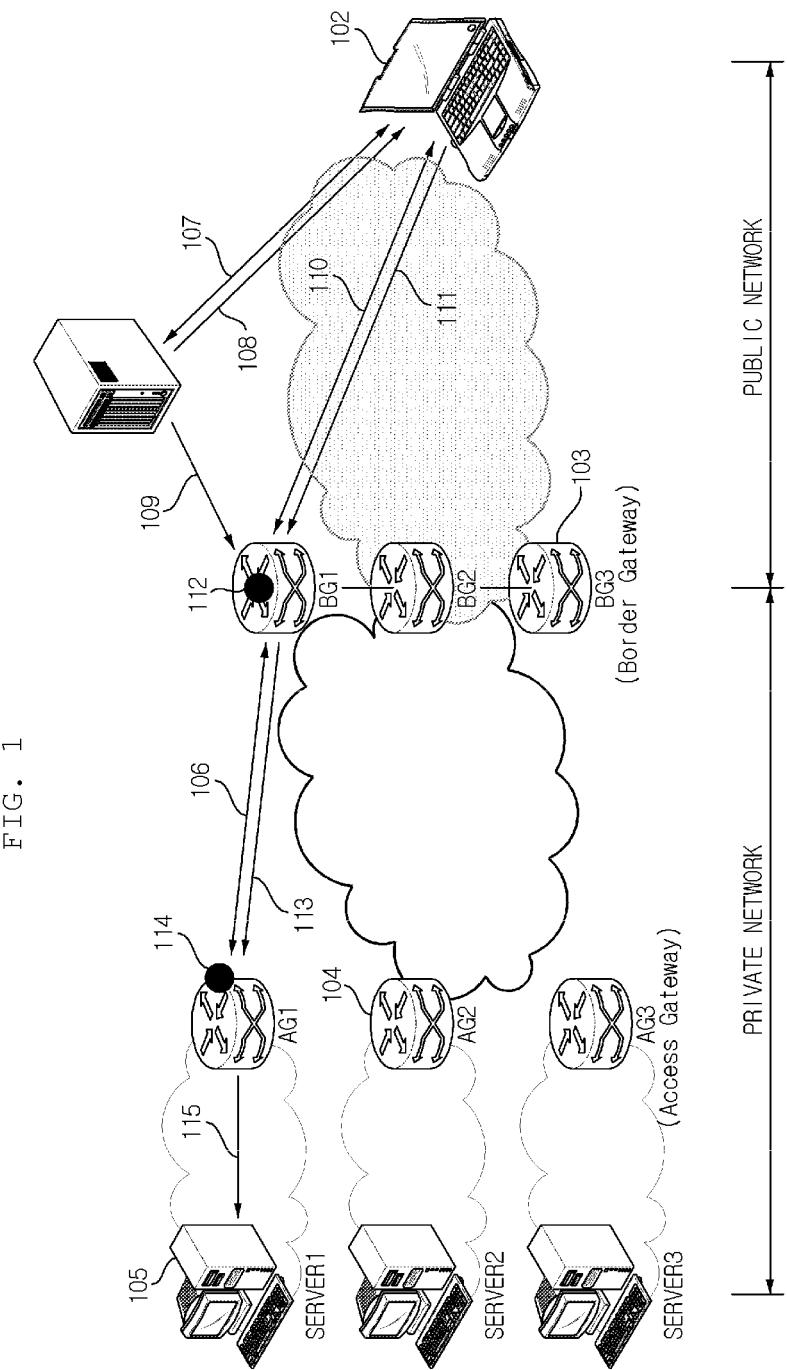
FIG. 1 is a diagram showing a configuration of a system for managing virtual private networks performing a network concealment procedure and a VPN procedure according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is to be noted that the technical terms used in the specification are used for describing only specific exemplary embodiments and are not limited to the present invention. Unless specifically indicated in the specification, the technical terms used in the specification is interpreted as meanings generally understood in the art to which the present invention pertains and is not to be construed as excessively comprehensive meanings or excessively reduced meanings. When the technical terms used in the specification are wrongly used technical terms that do not accurately represent the idea of the present invention, they are to be replaced with the technical terms that can be correctly understood by those skilled in the art. General terms used in the present invention are to be construed according to previously defined contents or contexts and is not to be construed as excessively reduced meanings.

Singular forms are intended to include plural forms unless the context clearly indicates otherwise. In the specification, terms "include" or "configure" described above may be construed as including the corresponding components unless other contrary descriptions are presented and therefore, further including other components rather than excluding other components and are to be construed as not including some components or some steps and further including additional components or steps.

Terms including an ordinal number such as "first", "second", and the like, may be used to describe various components, but the components are not limited to the above terms. The terms are only used to differentiate one component from other components. For example, the first component may be called the second component without departing from the scope of the present invention. Likewise, the second component may be called the first component.

Hereinafter, the exemplary embodiments of the present invention will be described with reference to the accompanying drawings. The same or like components are denoted by the same reference numerals and the description thereof will be omitted.

When it is determined that the detailed description of the known art related to the present invention may obscure the gist of the present invention, the detailed description thereof will be omitted. It is to be noted that the accompanying drawings are to be easily understood the idea of the present invention and are not construed as limiting the idea of the present invention.

The present invention describes a method for preventing Internet protocol (IP) addresses of private networks or servers from being exposed to the outside. When using the method proposed by the present invention, the IP addresses of the private networks or the servers are not exposed and thus are not included in a target of attack of attackers. The present invention describes a method for improving safety by applying a network concealment technology to virtual private networks (VPNs). In order not to expose a network to the outside, technologies such as network address translation (NAT), filtering, and the like, may be used, and for the VPN, technologies such as key exchange, data security, and the like, may be used.

FIG. 1 is a diagram showing a configuration of a system for managing virtual private networks performing a network concealment procedure and a VPN procedure according to an exemplary embodiment of the present invention.

First, a manager 101 manages a variety of information for concealing a network and managing virtual private networks (VPNs) Examples of the representative information may include client addresses (terminal addresses), VPN groups that can be accessed by a corresponding client (corresponding terminals), server lists accessible in the VPN groups, virtual server addresses used in public networks, server addresses used in the private networks, border gateway addresses, and the like. The network concealment and VPN procedures may be performed by appropriately transferring the information to a terminal 102 and a border gateway 112. In this case, the private networks may use both the private addresses and the public addresses and may be present in various types. The manager 101 may select (designate) any border gateway (for example, 112) to be accessed, among a plurality of border gateways.

The client (terminal) 102 means a terminal, wherein the terminal can appreciate only address information related to the public networks and does not mange address information about the private networks.

A border gateway 103 serves as the gateway that separates the public networks from the private networks. The border gateway 103 may serve as the gateway that separates a first public network and a second public network from each other, wherein the first public network and the second public network may be different networks (for example, networks having different data transmission modes).

An access gateway (AG) 104 is a gateway for the service server and may be present or may not be present according to a network condition.

A server 105 is a server providing a service and may require a key exchange function and an encrypting/decrypting function when the access gateway is not present.

Reference numeral 106 represents a key exchange procedure that is performed between the access gateway and the border gateway. If the access gateway is not present, the corresponding procedure may be performed between the service servers and the border gateways. However, when security is not required in a private network section, the corresponding procedure may be omitted.

Reference numeral 107 represents a procedure of allowing the manager 101 to authenticate the terminal 102. Various authentication methods can be used and are not specifically mentioned in the present invention.

Reference numeral 108 represents information that is transferred to the terminal 102 by the manager 101 after the authentication procedure is completed. The information includes the VPN groups that can be accessed by the terminals, the public network addresses of the border gateways (for example, 112) to be accessed, virtual address lists of the accessible servers (for example, 105), and the like. In this case, all the information is managed for each VPN group.

That is, the manager 101 transfers the public network addresses of the border gateways and the virtual address lists of the servers for each VPN group to the terminal 102. The manger 101 may select the border gateways to be accessed in consideration of a resource status of several border gateways and may randomly generate the server virtual addresses. In the present invention, a method for transferring the status information of the border gateways to the manager 101 and the detailed information thereof are not mentioned. Information of reference numeral 108 is protected using a security channel previously established between the manager 101 and the terminal 102.

Reference numeral 109 represents information that is transferred to the border gateways by the manager 101. As the transferred information, the terminal addresses, the server virtual addresses, and the addresses used in the actual private networks are transferred. The information is used for the network address translation (NAT) and the filtering in the border gateways. Information of reference numeral 109 is protected using a security channel previously established between the manager 101 and the border gateway.

Reference numeral 110 represents the key exchange procedure between the terminal 102 and a border gateway BG1. The key exchange procedure is not particularly limited, but a tunnel mode of Internet protocol security (IPSec) or a security technology of a tunnel type used in a "Full tunnel secure socket layer (SSL) VPN" is appropriate, and the key exchange mode suitable thereto is required.

Reference numeral 111 represents user data transferred from the actual terminal 102. A destination is the public network addresses of the border gateways received from the manager 101, and the user data of reference numeral 11 are protected using key information exchanged through a procedure of reference numeral 110 The border gateway BG1 112 represents a procedure of allowing the border gateways to process the user data received from the terminal 102. As the corresponding procedures, the procedure of decrypting the user data received from the terminal 102 and the NAT and filtering procedures are performed. The border gateway BG1 112 performs a function of separating the public networks from the private networks by changing all the IP addresses used in the public networks to the IP addresses used in the private networks by using the NAT procedure. The border gateway BG1 112 filters the user data so as to access only the servers that may be accessed by the terminal 102. That is, the filtering function determines whether the specific terminal accesses only the allowed service servers and discards the corresponding packets when the packets (user data) are transferred to the non-allowed servers. After the procedures are completed, if necessary, the corresponding packets are encrypted by using security policies established between the border gateways and the access gateways or the servers by the procedure of reference numeral 106 and then, are forwarded.

Reference numeral 113 represents the user data transferred from the border gateway 112. If the protection for the corresponding data is required, the data are protected using the security policies exchanged through the procedure of reference numeral 106, and if the corresponding data need not be protected, the data are transferred as a plain text without performing the procedure of reference numeral 106.

The access gateway 114 represents a procedure of processing the access gate. After the packets (user data) are received from the border gateway 112, the encrypted data are decrypted, and the NAT procedure is performed. The NAT procedure allows the packets to return to the terminals from the service servers. If the access gateways are not required, the corresponding procedure may be omitted.

Reference numeral 115 represents the user data transferred to the service server 105. The public networks may separate from the private networks by the above-mentioned procedures, and thus the information about the inside of the private networks is not published through the public networks.

Figure 2:
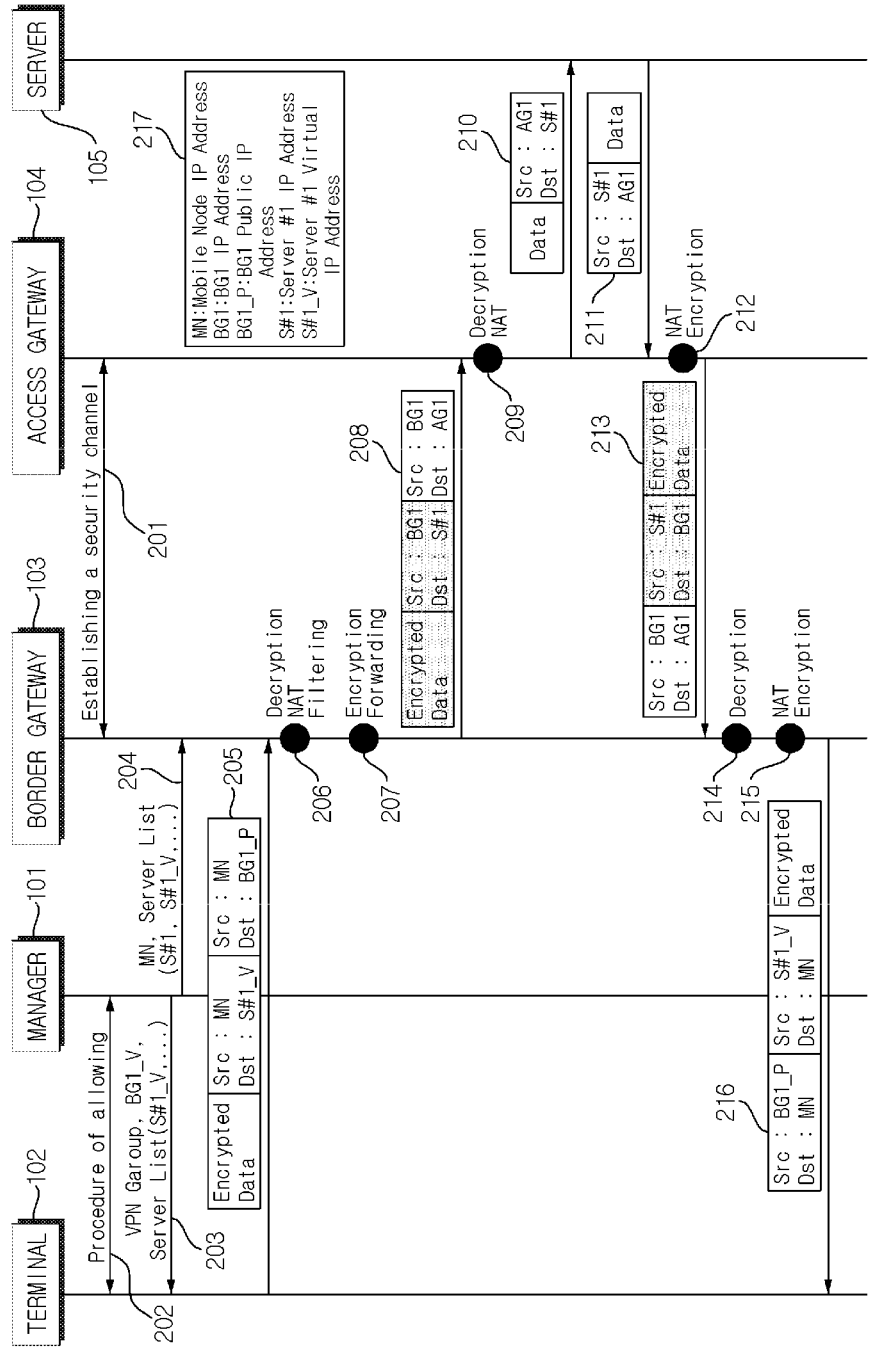
FIG. 2 is a diagram showing in detail the system for managing virtual private networks according to the exemplary embodiment of the present invention.

FIG. 2 is a diagram showing in detail the system for managing virtual private networks according to the exemplary embodiment of the present invention.

First, reference numeral 201 represents a procedure for establishing a security channel between the border gateways and the access gateways. If there is no need to establish the security channel between the border gateways and the access gateways, the corresponding procedure can be omitted, and then the exchanged data are not subjected to the encrypting/decryption procedures.

Reference numeral 202 represents a procedure of allowing the manager 101 to authenticate the terminal 102 of the user.

Reference numeral 203 represents information (for example, VPN groups, BG1_V, server list S#1_V, . . . ) transferred from the manager 101 to the terminal 102 after the authentication is completed. The corresponding information includes the VPN group list (VPN group) that can be accessed by the terminal 102, the public network address (BG1_V) of the border gateways for accessing the corresponding groups, and the virtual address lists of the servers (server list) that can be accessed through the corresponding groups, and the like. The users (terminals) may belong to at least one VPN group and may have the public network addresses of the border gateways and the virtual address lists of the servers that can access each VPN group. The manager 101 may randomly generate the server virtual addresses, and different server virtual addresses may be allocated to the same server every time according to the users (terminals) or the VPN groups. The server virtual addresses may be randomly generated by the manger 101, and different server virtual addresses may be allocated to the same server for each user or each VPN group. The virtual addresses are changed to the private network addresses used in the private networks in the boarder gateways. That is, the virtual addresses are any address used for differentiating the service servers in the public network, which need to correspond to the private network addresses one-to-one. On the other hand, the public network addresses of the boundary gateways means the routable addresses representing a path from the public networks to the boundary gateways.

Reference numeral 204 represents information that is transferred to the border gateways 103 by the manager 101. The transferred information may include a terminal address MN, server lists, and the like. The server lists include the virtual addresses of the service servers and the actual addresses valid in the private networks. When the terminals can access several border gateways, the information of reference numeral 204 may be transferred to several boundary gateways 103. That is, the information transferred for each boundary gateway may be different according to the setting of the VPN groups.

Reference numeral 205 represent the user data transferred from the terminal 102. In outside IP headers of the user data, designation addresses are the public network addresses of the boundary gateways, and the source addresses are the addresses of the terminals. In inside IP headers, the destination addresses are the virtual addresses of the service servers, and the source addresses are the addresses of the terminals. From the inside IP headers to general data are encrypted by using the address information of the outside IP headers, and as in reference numeral 205, when the packets are not an "IP-in-IP" type, data are protected by appropriate methods according to the security policies exchanged between the terminals 102 and the boundary gateways 103. The reason why the private network addresses of the servers or the boundary gateways are not used in the public networks is to prevent the private network addresses from being published to the public networks. That is, the virtual addresses mean any addresses rather than the actual addresses, and the virtual addresses and the actual addresses are changed by the NAT function in the border gateway 103.

Reference numeral 206 represents that the data received from the terminal 102 is decrypted and the NAT and filtering procedures are performed. The data decryption is performed according to the security policies and may be performed by various methods. When the data decryption is completed, the inside IP header and the decrypted data are generated in the packets in a type of reference numeral 205. The source addresses are changed to the private network addresses of the boundary gateways by using the NAT function, and the destination addresses are changed to the private network addresses of the service servers. It is determined whether the terminal 102 accesses the accessible service server 105 by using the NAT information.

Reference numeral 207 represents the data encryption and forwarding procedures after performing the procedure of reference numeral 206. The encryption uses the security policies established between the border gateway 103 and the access gateway 104 and may be performed by various methods.

Reference numeral 208 represents the data transferred from the border gateway 103. When the access gateway 104 is present, the encryption procedure is performed in the "IP-in-IP" packet type, and when the border gateway is not present, the encryption may be performed in a plain text type or a type having one IP.

Reference numeral 209 represents the decryption procedure and the NAT procedure that are performed in the access gateways. The NAT performs the source NAT function and is used to transfer the packets from the service servers to the terminals.

Reference numeral 210 represents the packets transferred to the service servers, and reference numeral 211 represents the packets transferred from the service servers to the terminals. Reference numeral 212 represents the procedure of NATing and encrypting the data received from the service servers. Reference numeral 213 represents the packets transferred from the access gateways, and reference numeral 214 represents the procedure of decrypting the received messages.

Reference numeral 215 represents the procedure of NATing and encrypting the decrypted data. All the addresses that are valid in the private networks are changed to the addresses that are valid in the public networks by the NAT procedure to prevent the address information of the private networks from being exposed to the outside.

Reference numeral 216 represents the messages transferred from the border gateway 103 to the terminal 102. It can be appreciated from the corresponding packets that all the address information that is valid in the private networks can be changed. Reference numeral 217 represents that the meanings of the addresses used in FIG. 2 are arranged.

Figure 3:
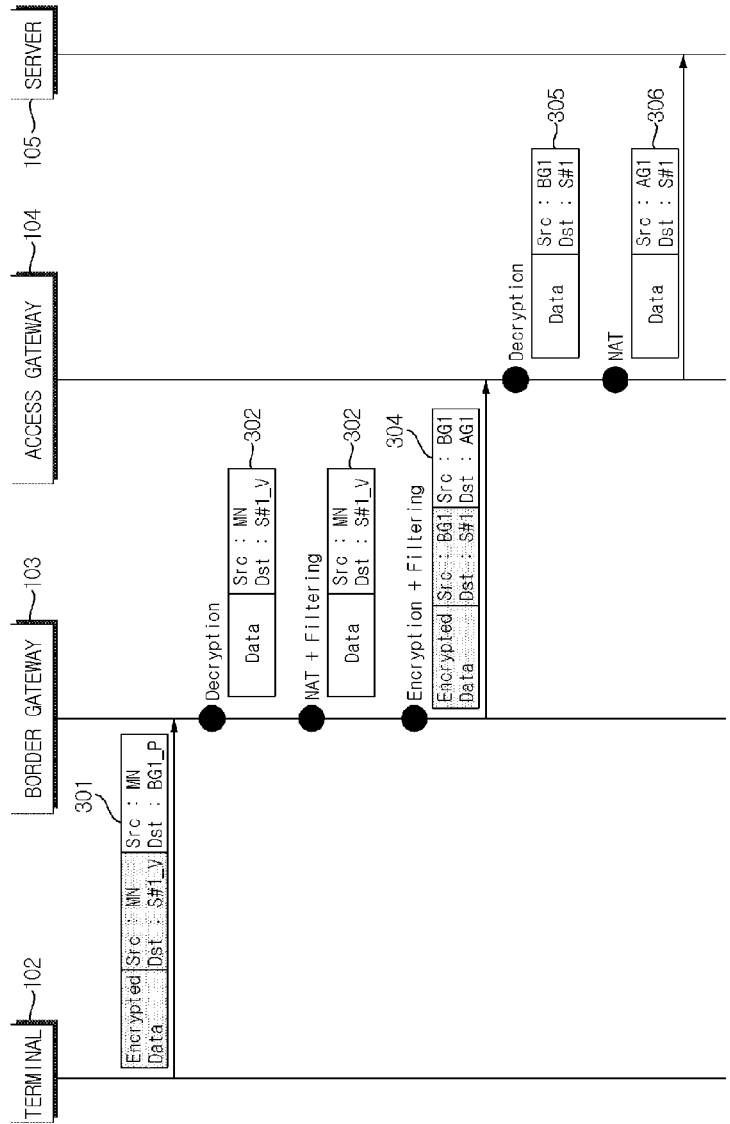
FIG. 3 is a diagram showing a process of processing packets (user data) transferred from terminals to service servers according to an exemplary embodiment of the present invention.

FIG. 3 is a diagram showing a process of processing the packets (user data) transferred from the terminal 102 to the service server 105 according to the exemplary embodiment of the present invention.

First, reference numeral 301 represents the user data transferred from the terminal 102 to the boundary gateway 103. From behind the outermost IP header to the user data are encrypted, and the address information that is valid in the private network is not exposed. The terminals do not also know the addresses of the service servers that are valid in the private networks, and thus the private network addresses are not exposed.

Reference numeral 302 represents the data type after decrypting the user data in the border gateway 103. In the "IP-in-IP" packet type, the decryption procedure is performed using the outside IP, and the outside IP header is removed. When data are not the IP-in-IP packet type, the decryption procedure is performed according to the security policies.

Reference numeral 303 represents results obtained by performing the NAT and filtering procedures. The NAT changes the source addresses from the terminal addresses to the private network addresses of the border gateways and changes the destination addresses from the virtual addresses of the service servers to the private network addresses of the service servers. When the destination addresses are changed, the virtual addresses of the service servers may be mapped to the private network addresses of the service servers one-to-one. On the other hand, when the source addresses are changed, several terminals can access the single border gateway 103, and as a result, a source port needs to be used. These procedures may use a general source NAT technology. The NAT information may be applied to the filtering procedure. That is, the server lists that can be accessed by the specific terminal 102 are received from the manager 101, and the received contents may be managed in a separate table or an NAT table. The contents managed in the tables are the virtual address lists of the servers and the private network address lists of the servers that can be accessed by each terminal. The filtering function using the tables searches the corresponding tables by using the IP addresses included in the data received from the terminals, and removes the corresponding packets when the virtual addresses of the service server 105 included in the destination addresses of reference numeral 302 are not present in the tables. That is, the terminals may be prevented from being illegally accessed to the server by preventing the packets from being transferred to the servers other than the server lists transmitted from the manager 101, which can be assessed by each terminal.

Reference numeral 304 represent the packets encrypted by using the security policies established between the border gateway 103 and the access gateway 104 after the NAT procedure is completed.

Reference numeral 305 represents the procedure of decrypting the encrypted packets received from the border gateways.

Reference numeral 306 represents the procedure of source NATing the decrypted user data.

Figure 4:
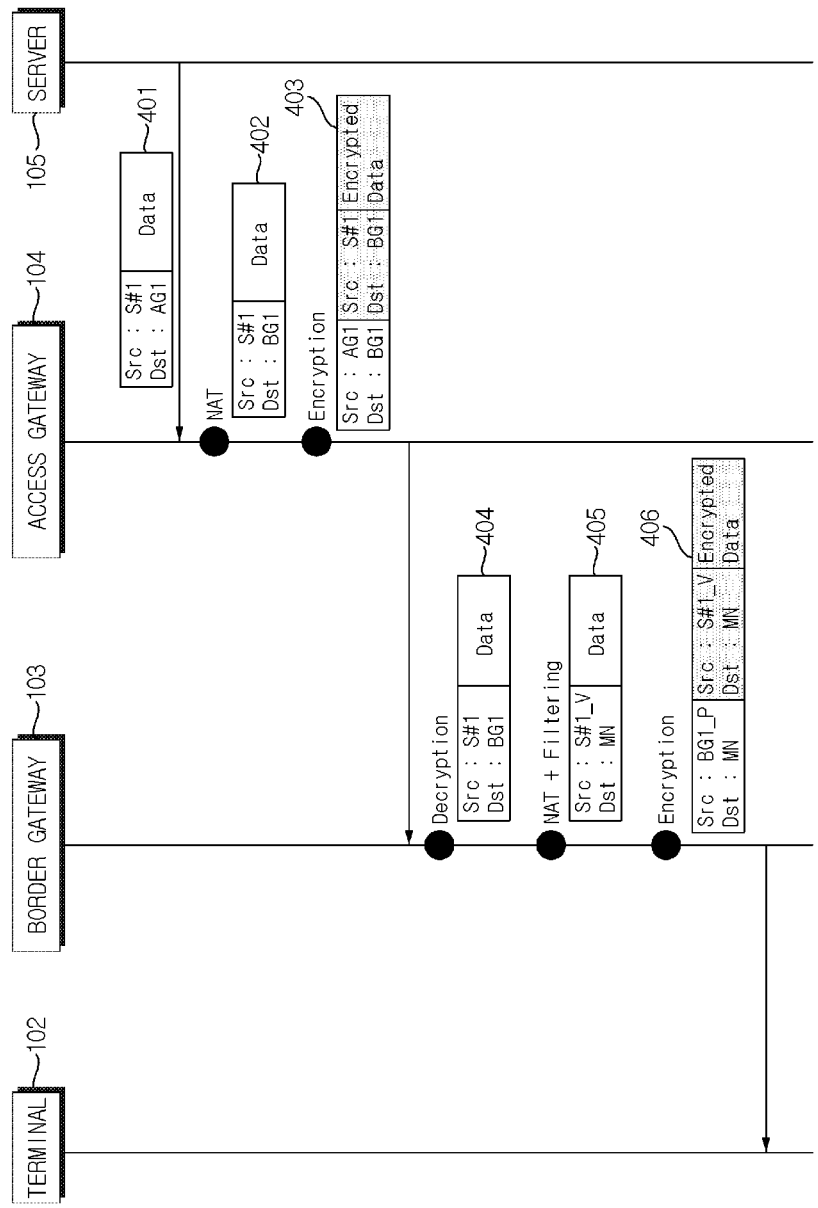
FIG. 4 is a diagram showing in detail a process of processing packets (server data) transferred from servers (service servers) to terminals according to an exemplary embodiment of the present invention.

FIG. 4 is a diagram showing in detail a process of processing packets (server data) transferred from servers (service servers) to terminals according to the exemplary embodiment of the present invention.

First, reference numeral 401 represents the data transmitted from the service servers. Reference numeral 402 represents a procedure of NATing the received data.

Reference numeral 403 represents a procedure of encrypting the NATed data. Reference numeral 404 represents a procedure of decrypting the encrypted data received from the access gateway 104. Reference numeral 405 represents the procedure of NATing the decrypted data. All the information related to the private network addresses is changed to the public network addresses by the procedure of reference numeral 405.

Reference numeral 406 represents a procedure of encrypting data. The terminals receiving data receive final data by a decryption procedure.

FIG. 5 shows an extended NAT table according to an exemplary embodiment of the present invention.

As shown in FIG. 5, the source IP represents the source addresses of the IP headers and the destination IP represents the destination resources of the IP headers. "Original" represents the addresses in the IP headers of the actual data packets, and "New" represents values that change the addresses in the IP headers of the data packets. In FIG. 5, the servers that can be accessed by the terminal of which the address is MN through the border gateway BG1 are server 1 (S#1) and server 2 (S#2). When a packet 301 of FIG. 3 is received in the border gateway 103, an NAT table of FIG. 5 is referenced so as to make the packet of reference numeral 302 into a packet 303 of reference numeral 303. That is, the source address MN and a port number MN_OSP, respectively, that are included in the IP packets, are changed to "BG1" and "BG1_NSP". That is, a destination address S#1_V and a port number S#1_V_ODP, respectively, that are included in the IP packets, are changed to "S#1" and "S#1_NDP". The addresses and the port numbers that are included in the IP headers are changed, and values are stored in each of the port items of the tables, by the above procedures. When receiving packets in a type of reference numeral 403, that are the reversely transmitted packets, the information subjected to the NAT processing is newly generated and stored in the tables. In this case, the generated table information is set so as to modify the source address S#1 and the source port S#1_NDP to the source address S#1_V and the source port S#1_V_ODP and to change the destination address BG1 and the destination port BG1 NSP to the destination address MN and the destination port MN_OSP. That is, when receiving the packets in the type of reference numeral 301 and performing the NAT procedure on packets of reference numeral 302 to packets of reference numeral 303, second and third items of FIG. 5 are generated. Through the procedures, the packets of a type of reference numeral 403 that are reversely transmitted may be decrypted, and the NAT function may be performed. After performing procedures of reference numeral 109 or reference numeral 204 receiving the information from the manager 101, the type stored in the NAT table is the same as the first item of the NAT table.

In FIG. 5, a flag, which is a field for determining whether to perform the filtering, means that the filtering function needs to be performed, in the case of "Set". When the flag is set to "Set", it is confirmed whether the source addresses and the destination addresses included in the IP headers of the received packet are present in the NAT table, and if the source addresses and the destination addresses included in the IP headers of the received packet are not present in the NAT table, the corresponding packets are discarded. The filtering information may also be designed so as to be managed as the separate tables according to the implementations.

In order to provide the services, a domain name service (DNS) technology may be required. When using the method proposed in the present invention, it is necessary to consider the followings in using a general DNS type. The general DNS function returns a single server address for the specific server. However, the method proposed by the present invention needs several addresses for the single server. That is, when requesting the address information for the same server, the virtual addresses of the server for each terminal need to be allocated differently. The reason is that the general DNS server transfers the IP information to arrive at the service servers, while the DNS servers used in the present invention provide the virtual addresses of the service servers to each terminal. The DNS function used in the present invention needs to allocate different addresses to the same servers. In this case, the virtual addresses of the service servers are randomly generated and may be limited to the private address region defined in Internet Assigned Numbers Authority (IANA). When the virtual addresses of the service servers are allocated as the public addresses rather than the private addresses, the conflict) with equipments actually using the authority addresses may occur. The DNS type proposed in the present invention may be provided by the manager 110, and the separate DNS equipment may be operated.

As described above, the system for managing virtual private networks and a method thereof according to the exemplary embodiments of the present invention have the following advantages.

First, the address information of the private networks to be protected is not exposed to the outside. This feature can secure the safety from various attacks in addition to the DDoS. In particular, since the terminals cannot acquire the information related to the private network addresses, it is possible to have more improved safe characteristics.

Second, the border gateways that are accessed by the terminals are randomly designated by the manager, which may be a technology of improving the safety. That is, when accessing the specific service servers through the same border gateways at all times, the packet destination may be exposed by attackers. In the present invention, the manager randomly designates the border gateways to be accessed so as to solve the above problems.

Third, it is possible to effectively prevent an illegal access to the service servers. That is, the filtering function in the border gateways may be performed using the NAT related information received from the manager. The method is a more effective method than the existing method using the security policies or an access control list (ACL).

Fourth, the users can easily access various VPN groups. The existing method can receive the VPN services for one organization or company but needs to overcome many problems such as a certificate management, an authentication procedure, an access control, and the like so as to receive the VPN services for other organizations or companies. However, the method proposed by the present invention can flexibly and easily access various VPN groups through the border gateways.

Fifth, it is possible to implement a lease service for the VPN function. That is, the user can receive the VPN services through the border gateways managed by a VPN service provider without maintaining separate equipment for security for each VPN group. These features may allow the user to use the lease services supported by the VPN service provider without maintaining the separate VPN equipment. The VPN lease services may be a new business model.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A system for managing virtual private networks (VPNs), comprising:
   terminals configured to transmit user data;
   a manager configured to transmit information for concealing networks and managing the VPNs;
   border gateways configured to decrypt the user data and perform a network address translation (NAT) procedure and a filtering procedure on the decrypted user data based on the information; and
   servers configured to receive the user data subjected to the NAT procedure and the filtering procedure,
   wherein the filtering procedure is a procedure discarding the user data to be transferred to the servers that are not allowed so as to allow the terminals to access only the allowed servers, the NAT procedure is a procedure changing an Internet protocol (IP) address used in a first network to an IP address used in a second network, and the first network and the second network are different networks,
   wherein the manager authenticates a terminal and transmits the information for concealing networks and managing the VPNs to an authenticated terminal,
   wherein the information for concealing networks and managing the VPNs includes a list of virtual addresses of accessible servers and each of the virtual addresses is generated with random numbers whenever the terminal logs in one of the VPNs,
   wherein the authenticated terminal can receive a service only when the terminal receives the information for concealing networks and managing the VPNs,
   wherein the manager randomly selects a border gateway to be accessed, among a plurality of border gateways.

2. The system of claim 1, wherein the first network is a public network, and the second network is a private network or a public network.

3. The system of claim 2, wherein the information transmitted by the manager includes the terminal addresses, VPN groups accessible by the terminals, server lists accessible in the VPN groups, virtual server addresses used in the public networks, server addresses used in the private networks, and the border gateway addresses.

4. The system of claim 3, wherein the border gateways discard the user data to be transferred to servers other than server lists accessible in the VPN groups.

5. The system of claim 2, wherein the border gateways separate the public networks from the private networks through the NAT procedure.

6. The system of claim 1, further comprising:
   access gateways configured to perform the NAT procedure on the server data so as to transfer the server data to the terminals.

7. The system of claim 6, wherein the access gateways perform encryption after the NAT procedure performed on the server data.

8. The system of claim 7, wherein the border gateways decrypt the encrypted server data, perform the NAT procedure and the encryption on the decrypted server data, and transmit the encrypted server data to the terminals.

9. The system of claim 1, wherein the manager randomly generates the virtual addresses of the servers and allocates the generated virtual addresses to the servers, the virtual addresses being differently allocated to the servers every time according to the users or the VPN groups.

10. A method for managing virtual private networks (VPNs), comprising:
    transmitting user data by terminals;
    transmitting information for concealing networks and managing the VPNs by a manager;
    decrypting the user data and performing a network address translation (NAT) procedure and a filtering procedure on the decrypted user data based on the information, by border gateways; and
    receiving the user data subjected to the NAT procedure and the filtering procedure by servers,
    wherein the filtering procedure is a procedure discarding the user data to be transferred to the servers that are not allowed so as to allow the terminals to access only the allowed servers, the NAT procedure is a procedure changing an Internet protocol (IP) address used in a first network to an IP address used in a second network, and the first network and the second network are different networks,
    wherein the manager authenticates a terminal and transmits the information for concealing networks and managing the VPNs to an authenticated terminal,
    wherein the information for concealing networks and managing the VPNs includes a list of virtual addresses of accessible servers and each of the virtual addresses is generated with random numbers whenever the terminal logs in one of the VPNs,
    wherein the authenticated terminal can receive a service only when the terminal receives the information for concealing networks and managing the VPNs,
    wherein the manager randomly selects a border gateway to be accessed, among a plurality of border gateways.

11. The method of claim 10, wherein the first network are a public network, and the second network is a private network or a public network.

12. The method of claim 11, wherein the information transmitted by the manager includes the terminal addresses, VPN groups accessible by the terminals, server lists accessible in the VPN groups, virtual server addresses used in the public networks, server addresses used in the private networks, and the border gateway addresses.

13. The method of claim 12, wherein in the filtering, the user data to be transferred to servers other than server lists accessible in the VPN groups are discarded.

14. The method of claim 11, wherein the NAT procedure separates the public networks from the private networks by changing the Internet protocol (IP) address used in the public networks to the IP addresses used in the private networks.

15. The method of claim 10, wherein the transmitting of the information by the manager includes:
    transmitting the information to the selected border gateways.

16. The method of claim 10, further comprising:
    performing the NAT procedure on the server data so as to transfer the server data to the terminals, by access gateways.

17. The method of claim 16, wherein the performing of the NAT procedure on the server data further includes performing encrypting on the server data subjected to the NAT procedure.

18. The method of claim 17, further comprising:
    decrypting of the encrypted server data;
    performing the NAT procedure and the encryption on the decrypted server data; and
    transmitting the encrypted server data to the terminals.

19. The method of claim 10, further comprising:
randomly generating the virtual address of the servers by the manager,
wherein the virtual addresses are differently allocated to the servers every time according the users or the VPN groups.

* * * * *